Oct. 27, 1942.   R. H. CROUCH   2,299,964
ELECTRICAL TREATMENT OF WATER TO REDUCE EFFECTS OF HARDNESS THEREOF
Filed Oct. 6, 1936    2 Sheets-Sheet 1
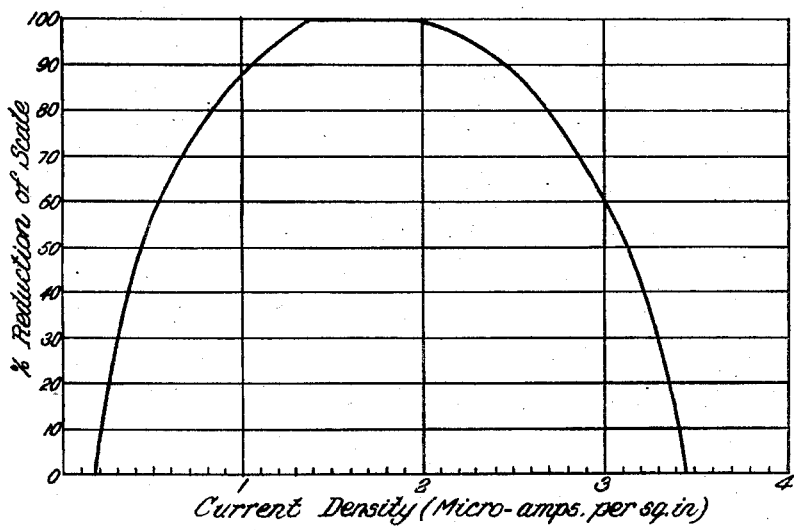
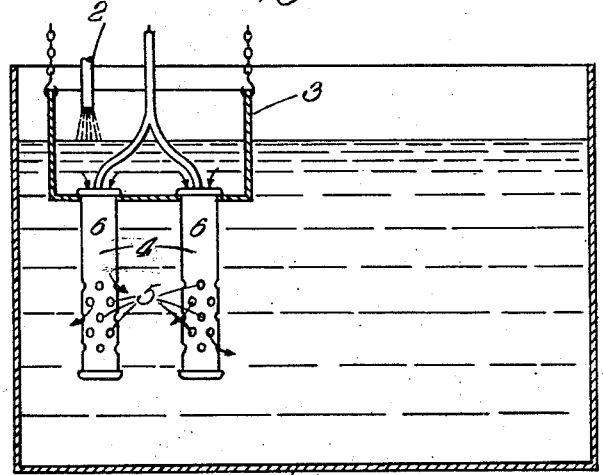
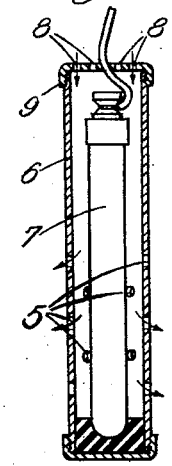
INVENTOR
Reginald H. Crouch,
BY Carroll Bailey
ATTORNEY Oct. 27, 1942.  R. H. CROUCH  2,299,964
ELECTRICAL TREATMENT OF WATER TO REDUCE EFFECTS OF HARDNESS THEREOF
Filed Oct. 6, 1936  2 Sheets-Sheet 2
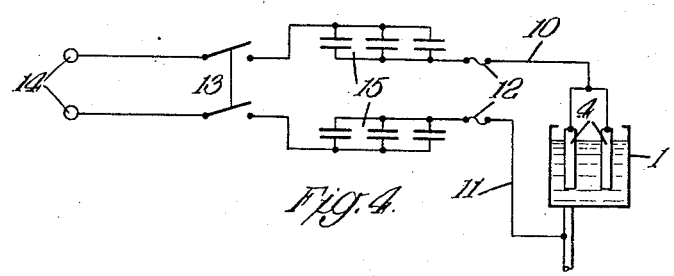
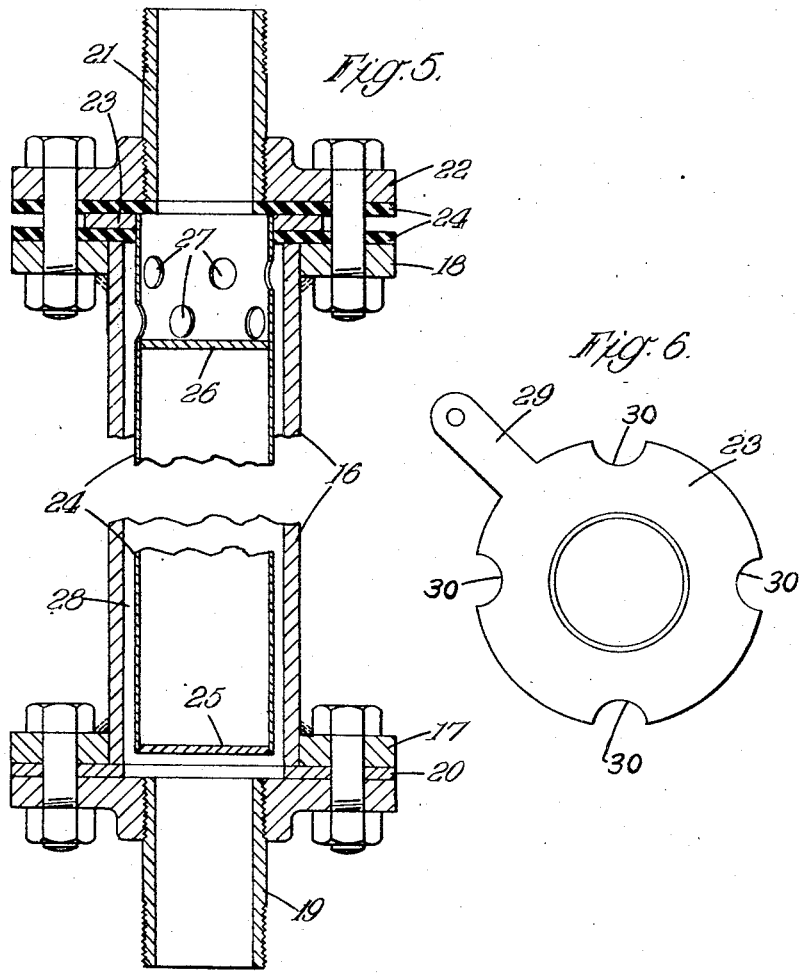
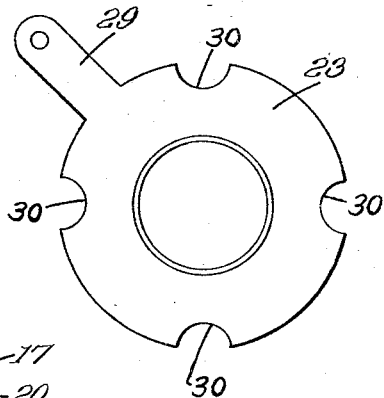
INVENTOR
Reginald H. Crouch,
BY Carroll Bailey
ATTORNEY Patented Oct. 27, 1942

2,299,964

UNITED STATES PATENT OFFICE 2,299,964

ELECTRICAL TREATMENT OF WATER TO REDUCE EFFECTS OF HARDNESS THEREOF

Reginald Henry Crouch, London, England

Application October 6, 1936, Serial No. 104,264
In Great Britain October 15, 1934

5 Claims. (Cl. 204—149)

The present invention relates to the treatment of water for the purpose of reducing at least some of the effects of the hardness thereof.

The hardness of water has usually been removed by a chemical process which serves to withdraw the particular impurities which cause the hardness. The present invention is concerned with the reduction of effects of hardness, not by the removal of impurities causing hardness, but by producing a modification of the physical properties of the water. Thus water which has been treated according to the present invention may be evaporated and the residue is found to be in the form of a mud instead of a hard scale as would normally be the case.

Experiments have shown that the desired results can be obtained by passing through the water to be treated an alternating electric current, the current density required for useful results lying between relatively narrow limits. The actual strength of the current required may vary widely according to the areas of the electrode surfaces employed to produce the flow of current through the water and it is the current density which has to be carefully adjusted.

According to the present invention, therefore, there is provided a method of treating water to reduce effects arising from the hardness thereof, which comprises passing through the water to be treated an alternating electric current having a density between 0.2 and 3.4 microamperes per square inch.

Other features of the invention, including certain apparatus which is particularly suitable for use in carrying out the invention, will be apparent from the following description and from the appended claims.

The invention will be described with reference to the accompanying drawings, in which Fig. 1 is a curve showing the relation between the current density to which water is subjected and the reduction in scale formation, Fig. 2 shows diagrammatically one form of apparatus for applying the method of the present invention, Fig. 3 shows a detail of Fig. 2 in section to an enlarged scale, Fig. 4 is a circuit diagram showing how the desired current density can be obtained from a mains supply, Fig. 5 shows in section a preferred form of apparatus according to the present invention and Fig. 6 is a plan view of a detail of Fig. 5.

Referring to Fig. 1, there is shown a curve obtained by plotting current density to which water has been subjected, as abscissa, and percentage reduction of scale, as ordinate. The reduction of scale is shown as a percentage of the scale produced by untreated water so that 0 represents no reduction in scale and 100 represents complete absence of scale formation within the limits of accuracy of the experiments from the results of which the curve of Fig. 1 is plotted.

It will be seen that in order to obtain reduction of scale it is necessary that the current density should be between 0.2 and 3.4 microamperes per square inch. For the best results involving a minimum of 50% scale reduction, however, current densities between the narrower limits of about 0.4 to 3.1 microamperes per square inch must be employed.

The curve of Fig. 1 was obtained using current from mains supply at 50 cycles per second. From experiments so far conducted, however, the frequency of the alternating current does not appear to be critical. The ripple from direct current supply mains can often be used where this is of sufficiently constant amplitude or where means are provided for rendering the ripple amplitude sufficiently constant.

In Fig. 2 there is shown diagrammatically simple apparatus for treating water flowing into a tank 1 from an input pipe 2. The water from pipe 2 flows into an auxiliary tank 3 having sealed in its base two electrode units 4. Any desired number of electrode units can of course be used. The water passes from the auxiliary tank 3 into the main tank 1 through orifices 5 in the outer shells 6 of the electrode units 4. The construction of the units 4 will be seen from Fig. 3. Within the shell 6 is arranged an electrode 7 of carbon or metal. The shell may be of insulating material or it may be of metal if the electrode 7 is arranged to be insulated from it.

In operation, an alternating potential difference is maintained between the electrodes 7, which are connected together, and the tank 1. This potential difference is arranged to be such that the current density at and near the surface of the electrodes 7 lies between the limits given above. Since all water from pipe 2 passes into the main tank 1 through apertures 8 in the caps 9 of the electrode units it is compelled to pass close to the electrodes 7 and thus to pass through a region in which it is traversed by an alternating current having over the whole of this region a current density between the required limits.

A suitable circuit for obtaining the necessary current from supply mains is indicated in Fig. 4. Leads 10 and 11 from the electrodes 7 and tank 1 respectively are connected through fuses 12 and a double pole switch 13 to terminals 14 which can be connected to the supply mains. In order to permit adjustment of the current passed through the water variable condenser units 15 may be interposed as shown. These may comprise a number of condensers arranged in parallel, adjustment of the current being effected by removing one or more of the condensers or by adding further condensers.

The form of apparatus for carrying out the present invention at present preferred is shown in Figs. 5 and 6. This apparatus is adapted to be interposed in a pipe line and to treat water passing along it. It comprises an outer circularly cylindrical tube 16 which may be of steel, having flanges 17 and 18 at its ends. The flange 17 is bolted to a flanged, threaded union member 19 whereby the apparatus can be connected with a water pipe. Suitable packing is indicated at 20. The flange 18 is bolted to a similar union member 21 having a flange 22. Between flanges 18 and 22 is clamped a copper flange 23, washers 24 of gutta percha being interposed to provide electrical insulation between the flanges 18 and 23. To the copper flange 23 is connected a circularly cylindrical copper tube 24 which extends within the tube 16 co-axially therewith. The lower end of the tube 24 is closed by means of a copper disc 25 and a second copper disc 26 is provided as closure near to the upper end of the tube. Above the disc 26 the copper tube 24 is provided with a number of holes 27.

In operation, water fed in through the union member 19 passes through the annular passage 28 between the tubes 16 and 24, through the holes 27 and thence out through the union member 21. The copper flange 23 is shown in front elevation in Fig. 6. It is provided with a number of recesses 30 which prevent contact between the flange 23 and the bolts serving to clamp together flanges 18 and 22. It is also provided with a tag 29 serving as a terminal for electrical connections.

A potential difference is applied between the tag 29, and hence the copper tube 24, and the outer tube 16, the magnitude of the potential difference being such that the current density in the annular passage 28 lies within the limits set forth. Because the radial thickness of the passage 28 is small compared with the diameters of the surfaces of the electrodes formed by the tubes 16 and 24, there is no considerable difference between the surface areas of these electrodes and the current density can be kept within the desired limits over the whole cross-section of the passage 28.

In one example of the apparatus of Figs. 5 and 6, the inner tube 24 has an outside diameter of 2⅛ inches and the outer tube 16 has an inside diameter of 2½ inches so that the radial thickness of the annular passage is $\frac{3}{16}$ of an inch. The length of the passage 28 is approximately 20 inches. A suitable rate of flow of water through apparatus of this kind has been found to be about 4–6 gallons per minute. Slower rates than this can of course be used without any disadvantage.

Reference is hereby made to copending application Ser. No. 44,989, filed in the United States on Oct. 14, 1935, now Patent No. 2,161,933 granted June 13, 1939, in which some of the described apparatus is claimed.

I claim:

1. A method of treating a body of water to reduce effects arising from the hardness thereof, which comprises passing through at least a major portion of the body of water to be treated an alternating electric current having a density between 0.2 and 3.4 microamperes per square inch.

2. A method of treating water to reduce effects arising from the hardness thereof, which comprises passing the water to be treated between spaced electrodes insulated from each other in the absence of the water, and passing between said electrodes and through the water an alternating electric current having a density between 0.2 and 3.4 microamperes per square inch.

3. A method of treating water to reduce effects arising from the hardness thereof, which comprises passing the water between spaced electrodes insulated from each other in the absence of the water, and passing between said electrodes and through the water an electric current having a density between 0.2 and 3.4 microamperes per square inch.

4. A method of treating water to reduce effects arising from the hardness thereof, which comprises passing the water in close proximity to one of a pair of electrodes insulated from each other in the absence of the water, and passing between said electrodes and through the water an electrical current having a density between 0.2 and 3.4 microamperes per square inch.

5. The method of treating water flowing to a tank, to reduce effects arising from the hardness thereof, which comprises passing the water, during its flow to the tank, in close proximity to the surface of an electrode insulated from the tank in the absence of the water, passing an alternating current between said electrode and said tank and through the water, and regulating the current so that its density, in the water in close proximity to the surface of said electrode, is of a value between 0.2 and 3.4 microamperes per square inch.

REGINALD HENRY CROUCH.